United States Patent
Bjorn

(10) Patent No.: US 6,799,275 B1
(45) Date of Patent: Sep. 28, 2004

(54) METHOD AND APPARATUS FOR SECURING A SECURE PROCESSOR

(75) Inventor: Vance C. Bjorn, San Carlos, CA (US)

(73) Assignee: Digital Persona, Inc., Redwood City, CA (US)

( * ) Notice: Subject to any disclaimer, the term of this patent is extended or adjusted under 35 U.S.C. 154(b) by 0 days.

(21) Appl. No.: 09/539,292

(22) Filed: Mar. 30, 2000

(51) Int. Cl.[7] .............................. H04L 9/00; G06K 9/00
(52) U.S. Cl. ...................... 713/186; 382/115; 382/124; 283/67; 283/69
(58) Field of Search ................................. 382/115, 125, 382/124; 283/67, 69, 78; 396/15; 713/186

(56) References Cited

U.S. PATENT DOCUMENTS

| | | | |
|---|---|---|---|
| 6,125,192 A | * | 9/2000 | Bjorn et al. ................. 382/124 |
| 6,185,316 B1 | * | 2/2001 | Buffam ........................ 382/115 |
| 6,241,288 B1 | * | 6/2001 | Bergenek et al. ............. 283/67 |
| 6,442,286 B1 | * | 8/2002 | Kramer ...................... 382/124 |
| 6,539,101 B1 | * | 3/2003 | Black ......................... 382/124 |

* cited by examiner

*Primary Examiner*—Emmanuel L. Moise
(74) *Attorney, Agent, or Firm*—Blakely Sokoloff Taylor & Zafman LLP; Judith A. Szepesi

(57) ABSTRACT

A method and apparatus for securing a secure processor is described. A plurality of spurious points are added to a biometric template. A received biometric data is matched to the biometric template. It is determined if the plurality of spurious points are present in the received biometric data. If the received biometric data matches the biometric template and the spurious points were not present in the received biometric data, access is granted to the secure processor.

24 Claims, 7 Drawing Sheets

METHOD AND APPARATUS FOR SECURING A SECURE PROCESSOR

FIELD OF THE INVENTION

The present invention relates to secure processor, and more specifically, to method of using biometrics to secure a secure processor.

BACKGROUND

Secure processors are processors that are difficult to access. Generally, above a certain level of security, a processor is considered a secure processor. One example of a secure processor is-a processor in a smart card.

A smart card is a card similar in size to today's plastic payment card that has a chip embedded in it. By adding a chip to the card, it becomes a smart card with the power to serve many different uses. As an access-control device, smart cards are used to make personal and business data available only to the appropriate users. Another application provides users with the ability to make a purchase or exchange value. Smart cards provide data portability, security and convenience.

Of course, access to the card should be secure. A challenge-response system is a common security technique whereby an individual is prompted (the challenge) to provide some private information (the response).

FIG. 1 illustrates a prior art security mechanism permitting access to the card. First, the smart card 110 is connected to the client 120. Then, the client 120 connects to the server 140 through a network 140. Using a challenge-response system, the server 130 sends a challenge to the client 120. A user enters a personal identification number (PIN) code (the challenge) into the smart card. If the PIN code is correct, this opens a session the use of a private key on the card. The server can send data to the card to be encrypted with the private key. The server can check the signature by using the public key of the card. Because confidential information, as well as digital cash, could be kept on a smart card, a better security system that can be certain of who is accessing a card, a smart card is advantageous.

SUMMARY OF THE INVENTION

A method and apparatus for securing a secure processor is described. A plurality of spurious points are added to a biometric template. A received biometric data is matched to the biometric template. It is determined if the plurality of spurious points are present in the received biometric data. If the received biometric data matches the biometric template and the spurious points were not present in the received biometric data, access is granted to the secure processor.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for securing a secure processor is described. In the prior art secure processors were accessed by typing in a password. This is problematic because the password could be stolen, captured, or broken by a third party. By using biometrics to access a secure processor is advantageous. However, the computation power available on a typical card is such that a full biometric match cannot take place on the card's processor. When the match is performed somewhere else the template and process are vulnerable. Therefore, the secure processor described here includes spurious points in the template on the secure processor, such that a third party who captures the template from the secure processor and attempts to access the secure processor by resending that template will fail.

One embodiment of a secure processor is on a smart card. For simplicity, the present invention is described with respect to a smart card. However, one skilled in the art knows how to extend this invention to alternative implementations of secure processors, now known or later developed. Additionally, the biometric pattern described below is that of a fingerprint. However, one skilled in the art understands that this may be extended to other biometric patterns, such as retinal matching, palm print matching, iris matching, etc. The present invention extends to any biometric pattern that includes characteristics extracted from the biometric pattern, and compared with a newly received biometric pattern. However, for simplicity, the example described below is with respect to a fingerprint.

Figure 1:
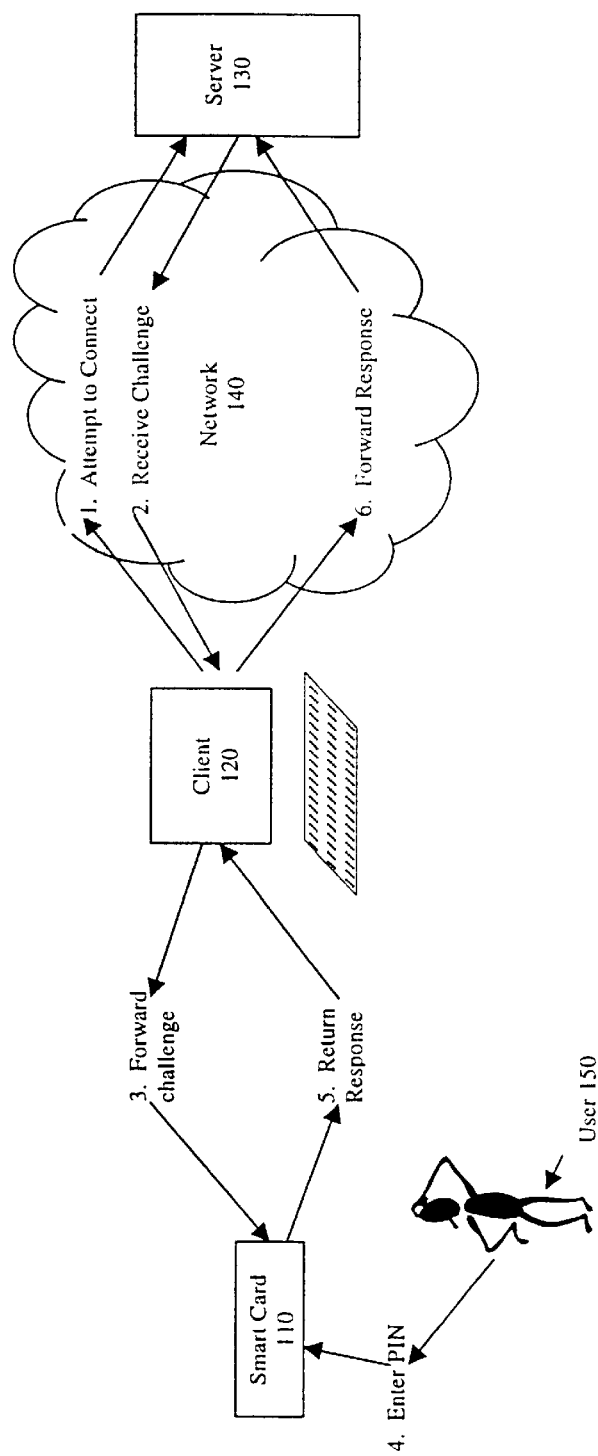
FIG. 1 illustrates a prior art smart card application.
Figure 2:
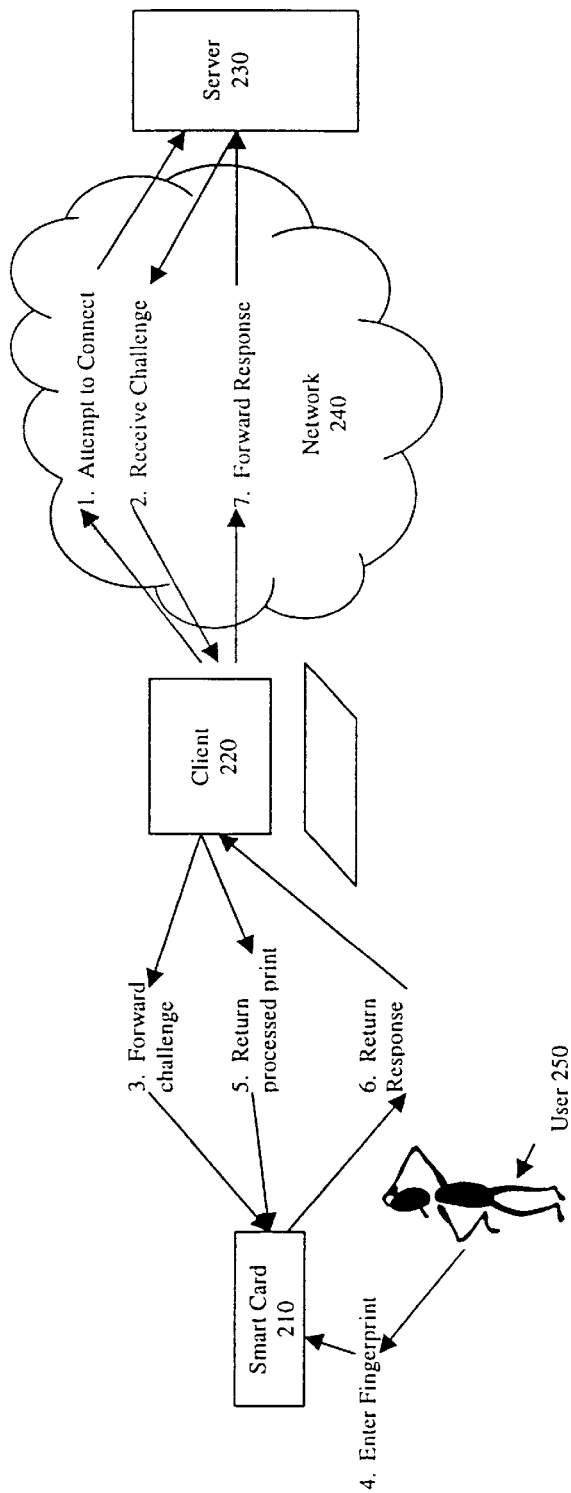
FIG. 2 illustrates the smart card application according to one embodiment of the present invention.

FIG. 2 illustrates a smart card application according to one embodiment of the present invention. For one embodiment, a challenge-response system is used. First, the smart card 210 connects to the client 220. For one embodiment, the card 210 is inserted into a smart card reader (not shown), or the client 220 may have a slot to receive the smart card 210. The client 220 may be a kiosk, a computer terminal, or any other communication system that permits the smart card 210 to communicate with a server 130. The client 220 attempts to establish a connection to the server 240. For one embodiment, the connection is established through a network 240. For one embodiment, the network 240 may be an unsecured network. A user 250 enters his or her fingerprint into the client 220, smart card reader, or fingerprint scanner designed to receive the fingerprint. The client 220 processes the fingerprint, and returns the processed fingerprint to the smart card 210. The smart card 210 performs a match.

Figure 3:
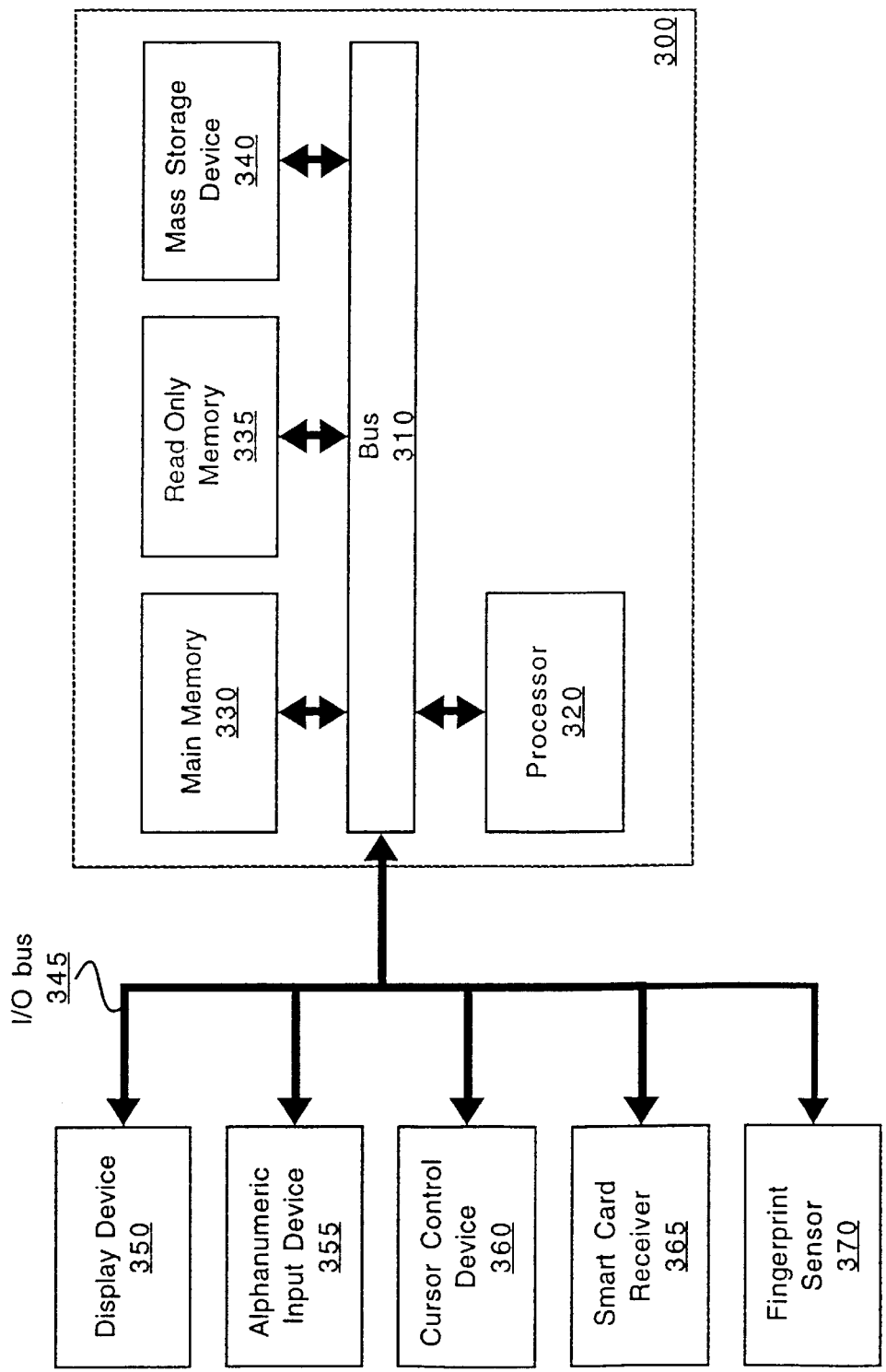
FIG. 3 is a block diagram of the computer system.

FIG. 3 is a block diagram of the computer system. The computer system 300 may be the client system, or may be both the client system and the server. A digital system 310 is a computing system which has the processing ability to compare a received digitized image with a database of digitized templates, and control a digital connection for receiving the digitized image. In the preferred embodiment, the digital connection is a data bus which conforms to a universal serial bus (USB) standard, as is well known to those of ordinary skill in the art. In this figure digital system 310 is represented as a computer system. The computer system 310 includes a body 320, which contains the processing power of the computer system 310. Computer system 310 also includes a display 330. The display 330 may be a liquid crystal display (LCD), cathode ray tube (CRT), or similar display mechanism. Computer system 310 includes a data entry mechanism 340. In this instance, a keyboard 340 is illustrated. The keyboard 340 permits a user to interact with the computer system 310. A conventional cursor control device 345 is further illustrated. The cursor control device 345 may be a mouse, trackball, pen, or similar device.

In one embodiment, sensor 350 is coupled to the computer system 310 via a cable 370. Alternatively, sensor 350 may be coupled to computer system 310 via an infrared, radio frequency, modem, network, or any other direct or indirect digital connection.

Figure 4:
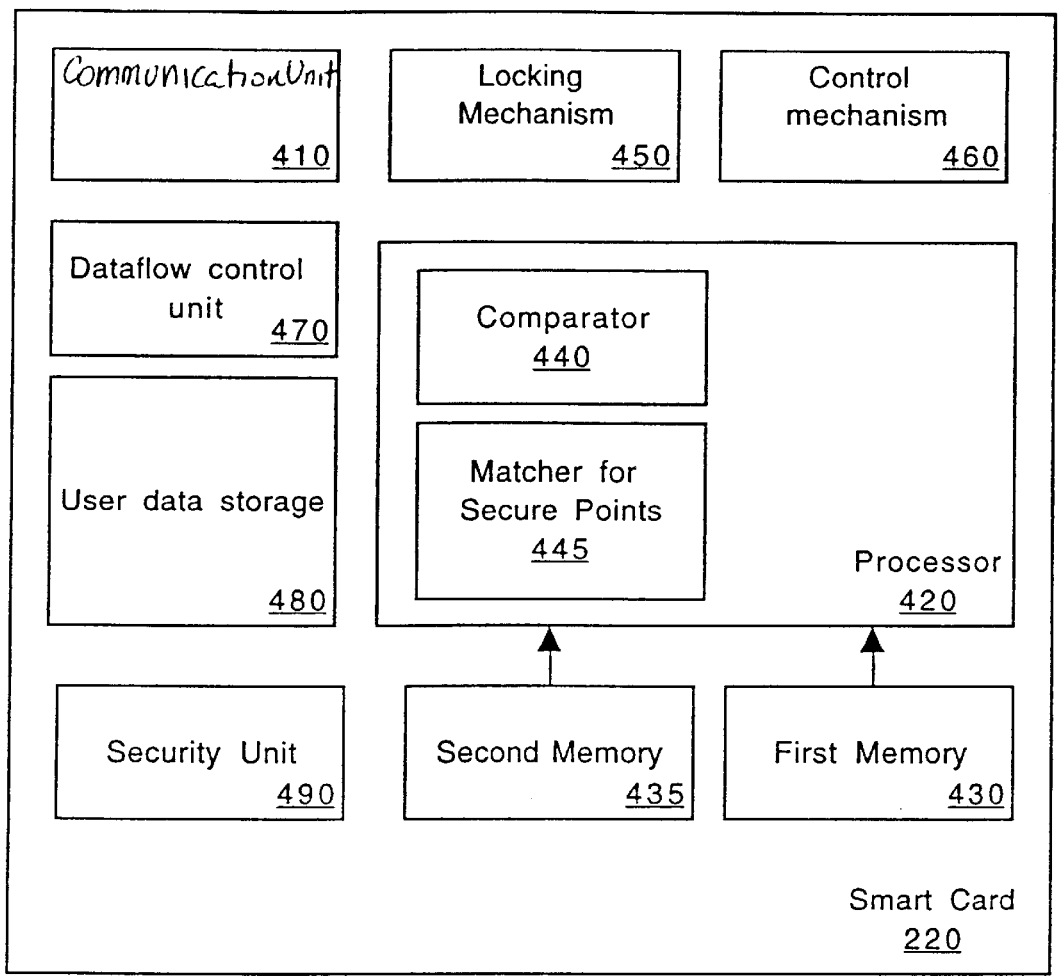
FIG. 4 is a block diagram of the smart card.

FIG. 4 is a block diagram of the smart card. The smart card 220 includes a communication unit 410. The communication unit 410 is for allowing the smart card to communicate with a client device, a network, and/or a card reader. The communication unit 410 may be a direct connection such as a cable, a connection signal through a transceiver, or any other way of coupling signals between the smart card and another device.

The smart card 220 further includes a processor 420. For one embodiment, the processor 420 is a standard processor, such as an 8-bit processor. For another embodiment, the processor 420 is any integrated circuit that can perform arithmetic operations.

The processor 420 further includes a comparator 440. The comparator 440 compares a template retrieved from memory with fingerprint data, as will be described below. The determination unit 445 evaluates whether the match determined by the comparator 440 is adequate. For one embodiment, the determination unit 445 communicates this information to the control mechanism 460. For one embodiment, the comparator 440 and the determination unit 445 may be implemented in hardware or software. For another embodiment, the comparator 440 and determination unit 445 may be outside the processor 420.

The control mechanism 460 determines whether the user whose fingerprint was received is the authorized user of the smart card 220. The security unit receives two sets of information from the determination unit 445. First, whether an adequate number of minutiae within the user's fingerprint matched the clean template—the template not including the SALT points. Second, what number of SALT points were matched. The control mechanism 460 determines whether the user is legitimate or whether someone unauthorized is attempting to access the smart card 220. If the user is legitimate, the control mechanism 460 permits the locking mechanism 450 to unlock the card 220. If the user is not legitimate, the control mechanism 460 does not permit the locking mechanism 450 to unlock the card. For one embodiment, during an extended period of time, a user may be required to log in again. If this is the case, and the repeat log-in is determined by the control mechanism 460 to be a spoof, the control mechanism 460 instructs the locking mechanism 450 to lock the smart card 220, and terminate access to the smart card 220. For one embodiment, the control mechanism 460 may also track the number of consecutive false users who attempt to log in. For one embodiment, the control mechanism 460 may notify the security unit 490, if a certain number of consecutive false users attempt to access the smart card 220. For one embodiment, for highly secure applications, this number may be sent to a server 230. The fingerprint information is secured by using SALT points, as will be described below.

The security unit 490 controls access to the user data storage 480, the first memory 430, and the second memory 435. For one embodiment, the first memory 430 stores the full template, including the SALT points of the user(s). The full template is sent to the client for matching. Thus, if an appropriate connection is established, the security unit 490 allows the full template to be sent to a possibly insecure client. The second memory 435 stores the SALT points. This memory 435 is not accessible to anyone except the comparator 440. The user data storage 480 stores any data for user(s). One of the purposes of a smart card 220 is to store secure information, and information in the user data storage 480 is not accessible unless the user of the smart card 220 has been identified, and is the authorized user of the card.

The security unit 490 further includes the private key to be used to permit establishment of a secure connection between a server and a client.

Figure 5:
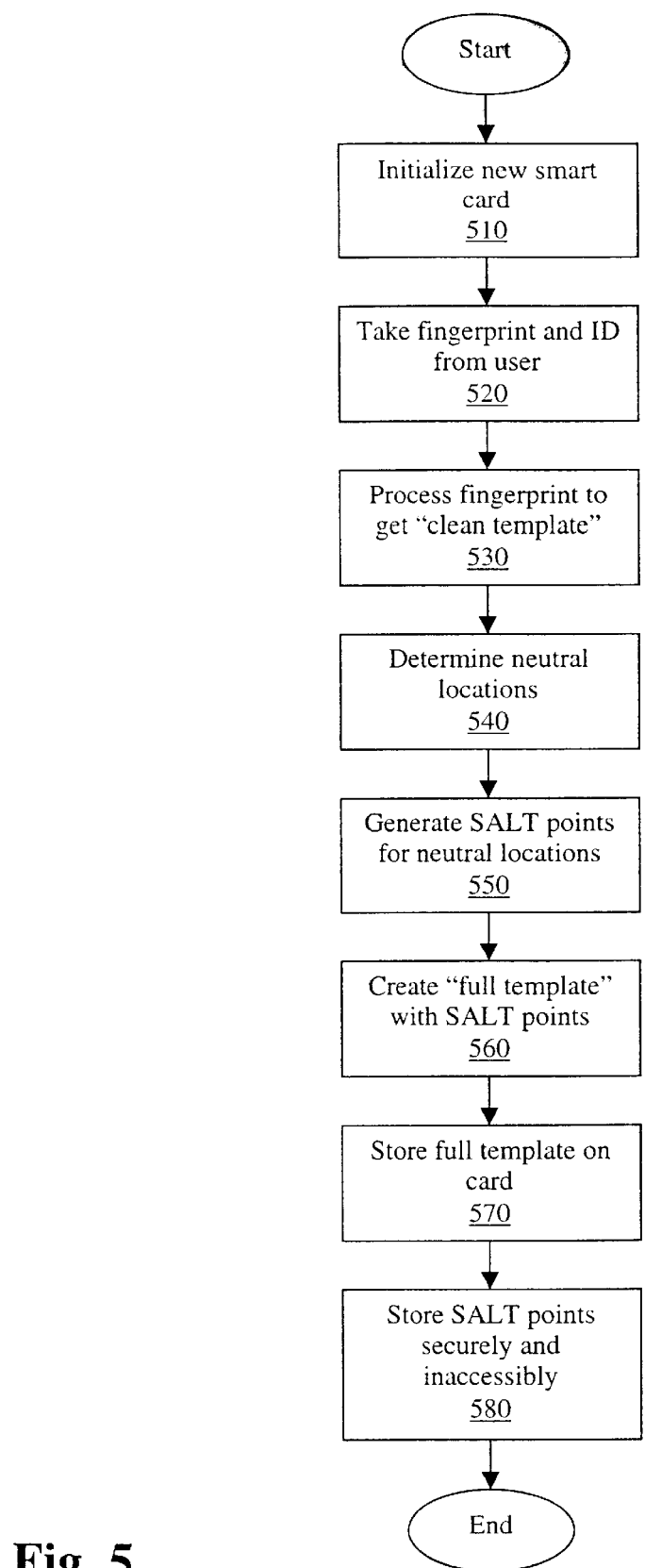
FIG. 5 is a flowchart of registering and storing a fingerprint.

FIG. 5 is a flowchart of registering and storing a fingerprint on a smart card 220. Once the finger print is stored, the smart card 220 is only accessible by the user having the same fingerprint as the registration print. For one embodiment, multiple users may be added to a single smart card, and each may have his or her own data only accessible to him or her. The process or registering additional users is identical to the process described below.

At block 510, the smart card is initialized. The initialization is generally prescribed by the manufacturer of the smart card. For one embodiment, the initialization is automatic when the smart card is inserted into the appropriate reader for the first time. For another embodiment, if the smart card is already initialized this step may be skipped.

At block 520, the fingerprint and identity of the user(s) of the smart card are taken. For one embodiment, multiple users may be added to the smart card sequentially. For one embodiment, multiple fingerprints are taken from a single user, and a composite fingerprint is generated. This composite fingerprint is further processed.

At block 530, the fingerprint is processed and a clean template is generated. Processing the fingerprint comprises identifying all of the minutiae in the fingerprint, along with their characteristics. A template is generated from all of these minutiae. The template includes the minutiae, including their characteristics and location.

At block 540, neutral locations are identified within the template. Neutral locations are locations in which the template is not overcrowded with minutiae. For example, an area in which it appears that the ridges are continuous, without minutiae, may be identified as a neutral location.

At block 550, SALT points are generated for these neutral locations. SALT points are spurious points that are placed within the template. For one embodiment, approximately eight to ten SALT points are generated.

At block 560, a full template is generated. This full template includes the original template with the minutia points and the SALT points.

At block 570, the full template is stored in the first memory of the smart card. This full template is used to do the initial match in the insecure client processor.

At block 580, the SALT points are stored in the second memory of the smart card. This second memory is inaccessible to the user, to an administrator, and to any process or processor outside the smart card itself.

The above process, after block 530, may take place on the smart card itself. For another embodiment, the process may take place within the client, in a secure area. For one embodiment, if any processing took place within the client, all memory used by the process is erased immediately when that process is completed. In this way, the time during which the data is accessible is kept to a minimum. Thus, for example, the SALT points may be stored in the second memory immediately after they are generated, at block 550. The SALT points are then added to the template, and the SALT points are erased.

Figure 6:
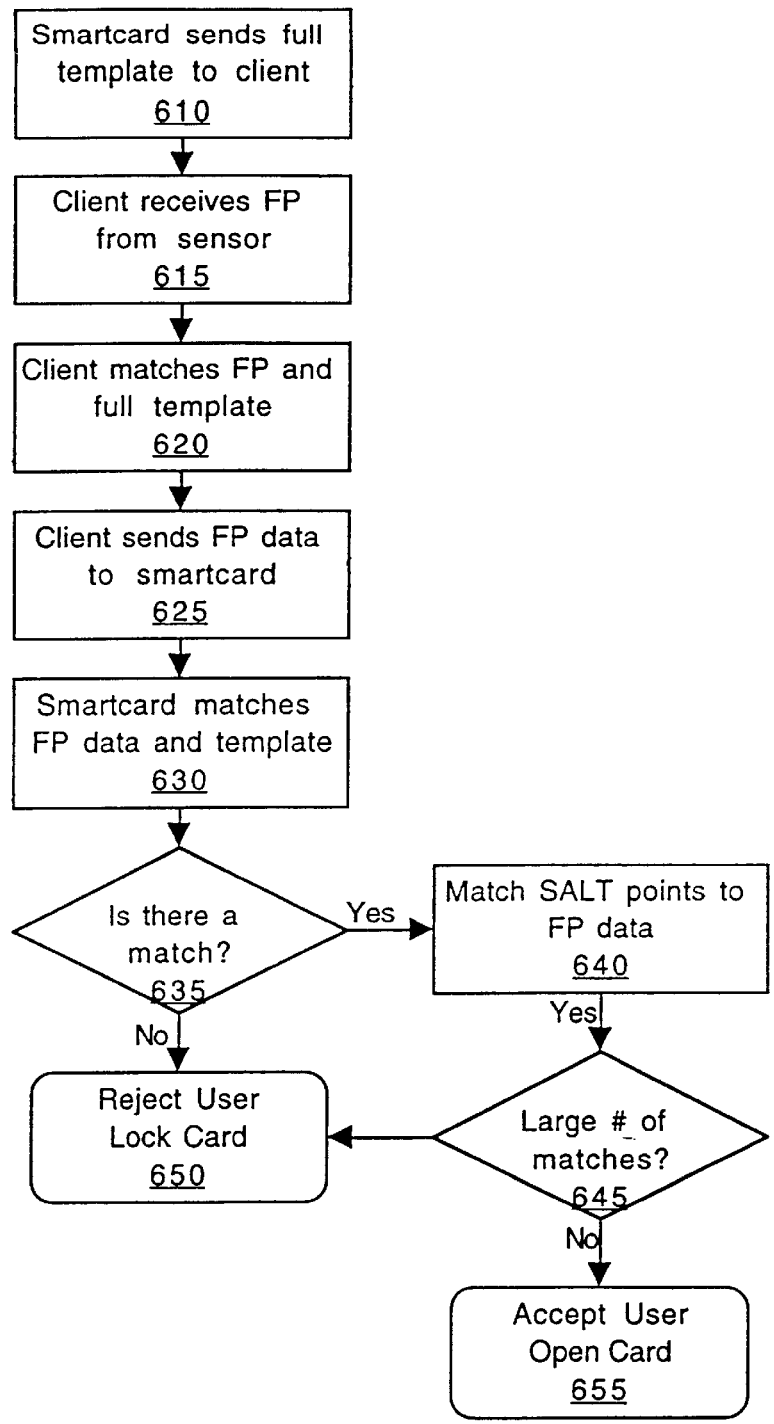
FIG. 6 is a flowchart of using the fingerprint.

FIG. 6 is a flowchart of using the fingerprint to access the smart card 220. For one embodiment, access to the smart card provides the response to the challenge of a server. For one embodiment, access to the smart card permits a user to manipulate the information in the user data storage area of the smart card. This information may be passwords, financial information, etc.

At block 610, the smart card sends the full template to the client. At block 615, the client receives the fingerprint from the sensor. For one embodiment, these steps may be reversed, and the smart card may send the information to the client only upon request, after the client receives the fingerprint from a user attempting to access the smart card.

At block 620, the client matches the fingerprint to the full template including SALT points. For one embodiment, this match includes determining the relative rotation, translation, and distortion of the fingerprint compared to the template. For one embodiment, the process described in U.S. Pat. No. 6,125,192 may be used. For another embodiment, other processes for extracting the location and characteristics of minutiae from a fingerprint may be used. The full template received from the smart card is then deleted.

At block 625, the client sends the fingerprint data to the smart card. The fingerprint data may include one or more of the following: minutia, the relative rotation, translation, and distortion of the input fingerprint data compared to the full template including SALT points, and the footprint extracted from the fingerprint.

At block 630, the smart card matches the fingerprint data and a template using the correspondence determined by the match on the server as an aid. For one embodiment, the comparator in the smart card performs this match. For one embodiment, the template used by the smart card is the full template minus the SALT points from the secure memory. In this way, only the true minutiae are matched. Since the smart card is not accessible, this is secure processing.

At block 635, it is determined whether there is a match between the fingerprint data and the template. If there is no match, the process continues to block 650. At block 650, the user is rejected, and the card is locked. For one embodiment, the process then ends.

If a match is found between the template and the fingerprint data at block 635, the process continues to bock 640. At block 640, the SALT points are matched to the fingerprint data. The SALT points are taken from the secondary memory.

At block 645, it is determined whether there is a large number of matching points. If there is a large number of matching points, the process continues to block 650, the user is rejected. A large number of matching SALT points indicates that someone is attempting to spoof the user by resending the template captured from the client. For one embodiment, if a certain number of spoofs is detected, the card is permanently destroyed, by deleting all information from the card.

If no large number of matches of SALT points is detected, the process continues to block 655, the user is accepted as the authorized user of the card, the card is opened to the user's access.

Figure 7:
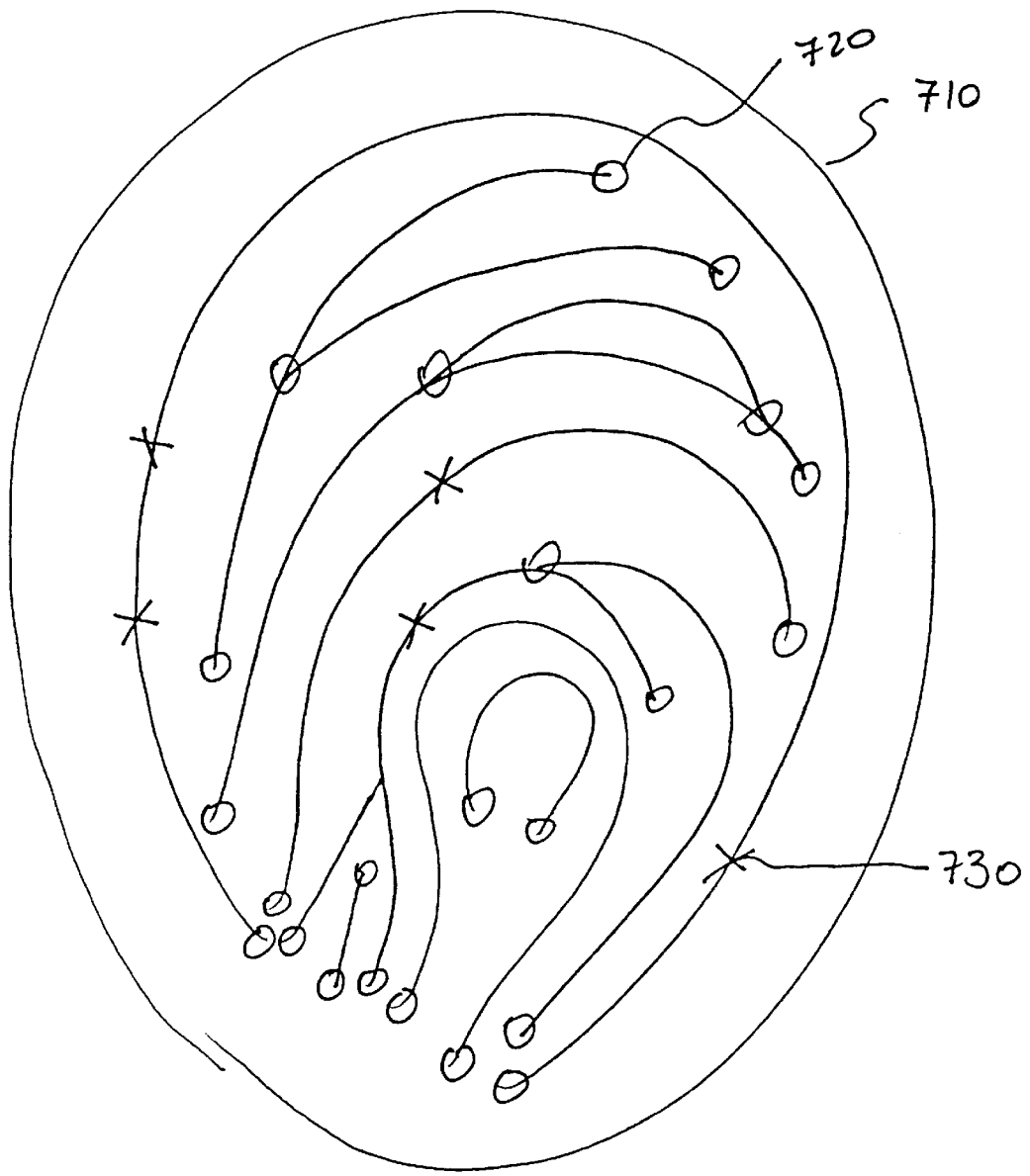
FIG. 7 illustrates a fingerprint and SALT points.

By using the SALT points 730, illustrated in FIG. 7 on a fingerprint image 710, the possibility of capturing a fingerprint during the matching process and using that captured fingerprint to get access to the smart card is eliminated. Thus, the SALT points 730 make the biometric process of accessing a smart card more secure.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method of using a biometric pattern to secure a private key, the method comprising the steps of:

adding a plurality of spurious points to a biometric reference template;

matching an input biometric pattern to the biometric reference template on an insecure processor;

determining if the plurality of spurious points are present in the input biometric pattern in a secure processor; and if the received input biometric pattern matches the biometric reference template, and a plurality of spurious points were not present in the input biometric pattern, granting access to the secure processor.

2. The method of claim 1, wherein the plurality of spurious points are separately stored in a secure memory.

3. The method of claim 2, wherein determining if the plurality of spurious points are present in the received biometric pattern comprises comparing the plurality of spurious points with the table of minutiae extracted from the received biometric pattern.

4. The method of claim 1, further comprising a full template that includes a plurality of minutiae of an authorized user's biometric pattern and the plurality of spurious points.

5. The method of claim 3, further comprising executing an initial match between the received biometric pattern and the full template including the plurality of spurious points on an insecure client system.

6. The method of claim 5, wherein executing an initial match comprises orienting the received biometric pattern properly and extracting a plurality of minutiae from the received biometric pattern.

7. The method of claim 6, wherein said step of orienting the received biometric pattern comprises establishing a preliminary match between the received biometric pattern and the full template, and correcting a rotation, translation, and/or distortion of the received biometric pattern.

8. The method of claim 6, wherein said step of extracting the plurality of minutiae from the received biometric pattern comprises generating a table including the plurality of minutiae including location and characteristics.

9. The method of claim 6 further comprising passing the table to the secure processor for further processing.

10. The method of claim 4, wherein said step of matching further comprises matching a table of minutiae extracted from the received biometric pattern to a correct biometric template.

11. The method of claim 10, wherein the correct biometric template is the full template minus the plurality of spurious points.

12. The method of claim 1, wherein the secure processor is a smart card.

13. The method of claim 1, wherein a thief can not access the smart card by stealing the template sent to a client for processing, because the template sent to the client is a full template including the spurious points.

14. The method of claim 1, wherein the biometric pattern is a fingerprint pattern.

15. A method of accessing a smart card comprising the steps of:

receiving a fingerprint;

extracting minutiae from the fingerprint on a first processor;

performing a preliminary match between the fingerprint and a first template including a plurality of stored minutiae and a plurality of spurious points on the first processor;

if the match was found, sending corrected version of the extracted minutiae from the fingerprint to a secure processor;

performing a match between the corrected version of the extracted minutiae of the fingerprint and a second template including the plurality of stored minutiae on the secure processor; and determining if the fingerprint includes the plurality of spurious points; and if the match does not include the plurality of spurious points, the permitting access to the smart card, and otherwise, rejecting access to the smart card.

16. The method of claim 15, the corrected version of the extracted minutiae comprises the extracted minutiae and rotation, translation and distortion of the fingerprint compared to the first template.

17. A secure processor comprising:

a first memory for storing a biometric template including a plurality of spurious points;

a second memory for storing a list of the plurality of spurious points;

a processor for matching a preliminary match of a biometric pattern received from an insecure processor to a template not including the plurality of spurious points; and a control mechanism for determining if the spurious points were present in the preliminary match of the biometric pattern, and refusing access to the secure processor if a certain number of the spurious points were present.

18. The secure processor of claim 17, wherein the second memory is not accessible from outside the secure processor.

19. The secure processor of claim 17, further comprising a communication unit for communicating with a client, such that the client receives the biometric template including the plurality of spurious points and returns the preliminary match to the secure processor via the communication unit.

20. The secure processor of claim 19, wherein the preliminary match comprises a plurality of extracted minutiae from an input biometric pattern, and a rotation, translation correspondence between the input biometric pattern and the biometric template.

21. The secure processor of claim 20, wherein the processor comprises:

a comparator for comparing the plurality of extracted minutiae with the template not including the spurious points and determining a number of matches; and a determination unit to determine whether the number of matches is sufficiently high to determine that the biometric pattern corresponds to the biometric template.

22. The secure processor of claim 21, wherein the comparator is further for comparing the plurality of extracted minutiae with the plurality of spurious points and determining a match number; and the control mechanism further for determining if the match number is sufficiently low to determine that the biometric pattern is genuine.

23. The secure processor of claim 17, wherein the secure processor is a smart card.

24. The secure processor of claim 17, wherein the biometric pattern is a fingerprint.

* * * * *